United States Patent
Kikuchi

(10) Patent No.: US 7,940,701 B2
(45) Date of Patent: May 10, 2011

(54) NETWORK SELECTION

(75) Inventor: Tsuneyuki Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 987 days.

(21) Appl. No.: 11/746,506

(22) Filed: May 9, 2007

(65) Prior Publication Data

US 2007/0275724 A1    Nov. 29, 2007

(30) Foreign Application Priority Data

May 26, 2006   (JP) .................................. 2006-146746

(51) Int. Cl.
*H04L 12/16* (2006.01)

(52) U.S. Cl. ...................................... 370/259; 455/436

(58) Field of Classification Search ........................ None
See application file for complete search history.

(56) References Cited

U.S. PATENT DOCUMENTS

| | | | |
|---|---|---|---|
| 6,801,542 B1 | 10/2004 | Subbiah | |
| 2006/0056341 A1* | 3/2006 | Takagi et al. ................. | 370/328 |
| 2008/0242300 A1* | 10/2008 | Binding et al. ............ | 455/435.2 |

FOREIGN PATENT DOCUMENTS

| | | |
|---|---|---|
| JP | 2003-348661 A | 12/2003 |
| JP | 2004-194064 A | 7/2004 |
| JP | 2004-282652 A | 10/2004 |
| JP | 2006-014137 A | 1/2006 |
| WO | WO 00/04733 A1 | 1/2000 |
| WO | WO2004-028098 A1 | 4/2004 |

OTHER PUBLICATIONS

Yile Guo, et al., "IP transport in 3G radio access networks:an MPLS-based approach" Wireless Communications and networking conferences, 2002, WCNC2002. 2002 IEEE, Piscataway, NJ, USA, vol. 1, Mar. 17, 2002, pp. 11-17, XP010585726.
Andrisano O, et al., "UMTS and WLAN Integration: Architectural Solution and Performance" Personal, Indoor and Mobile Radio Communications, 2005. PIMRC 2005. IEEE 16th International Symposium on Berlin, Germany Sep. 11-14, 2005, Piscataway, NJ, USA IEEE, Sep. 11, 2005, pp. 1769-1775, XP010927415.
Uskela S, "Key concepts for evolution toward beyond 3 G networks" IEEE Wireless Communications, IEEE Service Center, Piscataway, NJ, US, vol. 10, No. 1, Feb. 2003, pp. 43-48, XP011095590.

* cited by examiner

*Primary Examiner* — Phuoc Doan
(74) *Attorney, Agent, or Firm* — Sughrue Mion, PLLC

(57) ABSTRACT

A network selection for easily selecting a network according to its status is disclosed. A wireless base station control device selects a network based on a wireless base station and a type of information to be transmitted on the network among networks provided between the wireless base station and the wireless base station control device, and ensures a band for transmitting information to be transmitted.

18 Claims, 10 Drawing Sheets

Fig. 4

| Node B ID | NETWORK TYPE | TYPE OF INFORMATION TO BE TRANSMITTED |
|---|---|---|
| 1 | ATM NETWORK | ALL INFORMATION |
| 2 | ATM NETWORK | CONTROL MESSAGE, CIRCUIT SWITCHED DATA |
| | IP NETWORK | PACKET SWITCHED DATA |
| 3 | IP NETWORK | ALL INFORMATION |
| 4 | ATM NETWORK | CONTROL MESSAGE |
| | IP NETWORK | CIRCUIT SWITCHED DATA, PACKET SWITCHED DATA |
| ⋮ | ⋮ | ⋮ |

Fig. 5

| NETWORK TYPE | SETTING UPDATE TIMING INFORMATION |
|---|---|
| Transport A | 100ms |
| Transport B | 200ms |
| Transport C | 500ms |
| Transport D | 800ms |
| ⋮ | ⋮ |

Fig. 6

| UE ID | SERVICE USAGE |
|---|---|
| 1 | SENDING/RECEIVING DATA |
| 2 | NO DATA IS COMMUNICATED (SEVERAL SECONDS) |
| 3 | NO DATA IS COMMUNICATED (SEVERAL MINUTES) |
| 4 | SENDING/RECEIVING DATA |
| ... | ... |

NETWORK SELECTION

This application is based upon and claims the benefit of priority from Japanese Patent Application No. 2006-146746 filed on May 26, 2006, the content of which is incorporated by reference.

BACKGROUND OF THE INVENTION

1. Field of the Invention

The present invention relates to a mobile communication system, a wireless base station control device and an operation control method that apply a plurality types of networks.

2. Description of the Related Art

In recent years, the W-CDMA (Wideband-Code Division Multiple Access) method has become rapidly widespread for use in mobile communication systems.

FIG. 1 shows a mobile communication system using a conventional W-CDMA method that includes CN (Core Network) 1001, RAN (Radio Access Network) 1002 and UE (User Equipment) 1003. CN 1001 is a core network that provides a circuit-switching service or a packet-switching service. RAN 1002 is a wireless access network that is connected with CN 1001 via an Iu interface. UE 1003 is a mobile device owned by a user, connected with RAN 1002 via a Uu interface.

RAN 1002 further includes RNCs (Radio Network Controllers) 1004 and 1005 and Node Bs 1006 to 1009. RNCs 1004 and 1005 are wireless base station control devices that control Node Bs 1006 to 1009 and are connected to Node Bs 1006 to 1009 via an Iub interface. Node Bs 1006 to 1009 are wireless base stations for covering one or more cells. The number of RNCs 1004 and 1005 and the number of Node Bs 1006 to 1009 are not limited to those shown in FIG. 1.

The ATM network and the IP network are considered as examples of networks applied as RAN 1002, which is a wireless access network here. The wireless network control device that can address those networks is disclosed in WO2004-028098A.

The ATM network, which has been widely used as the RAN, is a network effective for transferring not only a circuit-switching service but also a packet-switching service and has functions for managing traffic and controlling the quality for traffic having various characteristics. To cover a wide range of RAN, a sufficient number of ATM lines needs to be laid. That leads to the problem that in introducing and operating the network, costs will increase.

On the other hand, the IP network, which has been newly added with Re1.5 specification of the 3GPP ($3^{rd}$ Generation Partnership Project), can lower the cost of introducing and operating the network as compared with the ATM network because fixed-networks have been significantly developed worldwide. However, the IP network has a problem in that it is not appropriate for transferring control information or a circuit-switching service because the transmission delays in this network are large.

The method described in WO2004-028098A does not include a flexible method for selecting between the ATM network and the IP network according to their conditions.

SUMMARY OF THE INVENTION

An object of the present invention is to provide a mobile communication system, a wireless base station control device and an operation control method that can easily select a network according to conditions.

According to the present invention, a network is selected based on the wireless base station and the type of information transmitted on a network among a plurality of types of networks that are provided between wireless base stations and wireless base station control devices. According to the present invention, a band for a network to transmit information transmitted on the selected network is also ensured.

Since the network that is suitable for the information is selected at any timing, networks provided in the mobile communication system can be effectively used without causing any wasteful transmission delay.

The above and other objects, features, and advantages of the present invention will become apparent from the following description with reference to the accompanying drawings which illustrate an example of the present invention.

BRIEF DESCRIPTION OF THE DRAWINGS

FIG. 4 is a diagram showing an example of the contents registered in the table of network types shown in FIG. 3;

FIG. 5 is a diagram showing an example of the contents registered in the setting update timing table shown in FIG. 3;

FIG. 6 is a diagram showing an example of the contents stored in the communication service usage table shown in FIG. 3;

DETAILED DESCRIPTION OF THE PREFERRED EMBODIMENTS

Figure 1:
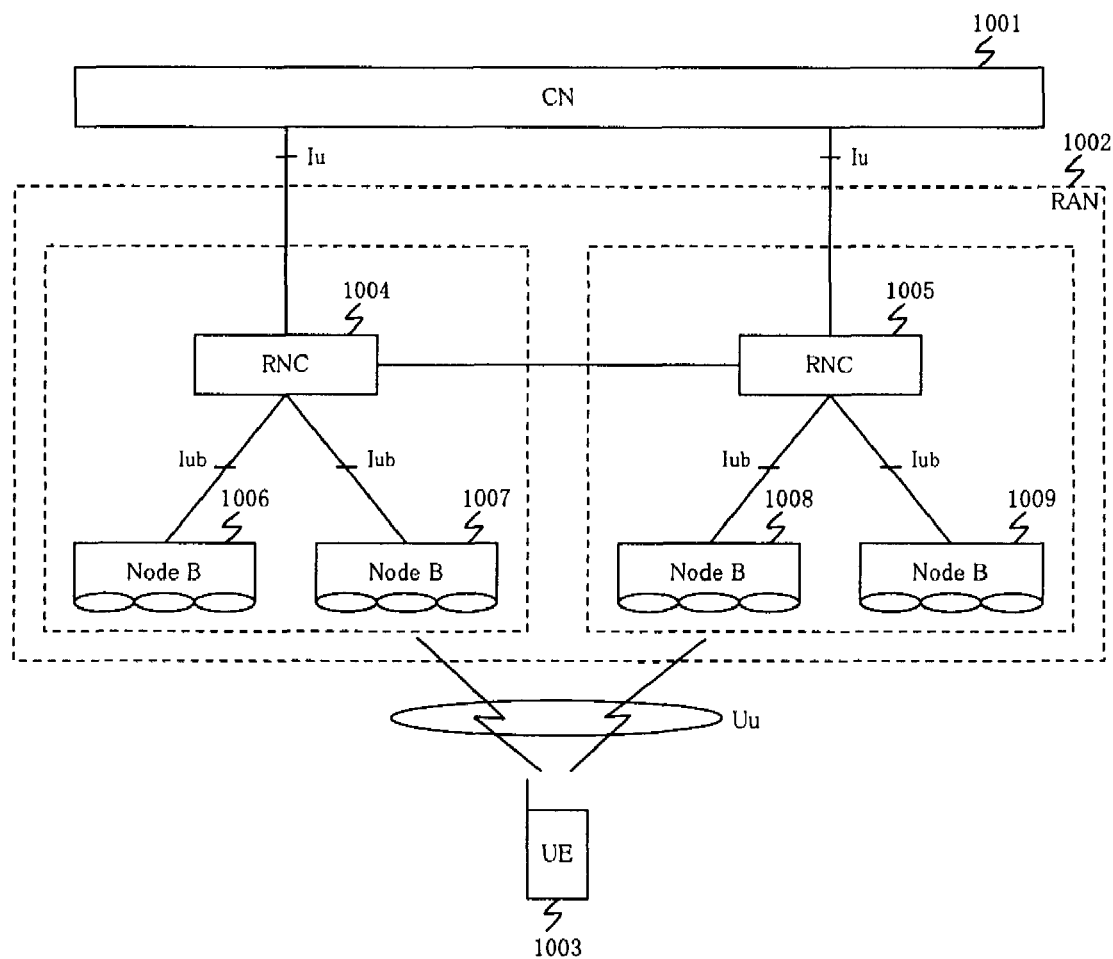
FIG. 1 is a diagram showing an example of a configuration of a mobile communication system using a conventional W-CDMA method.
Figure 2:
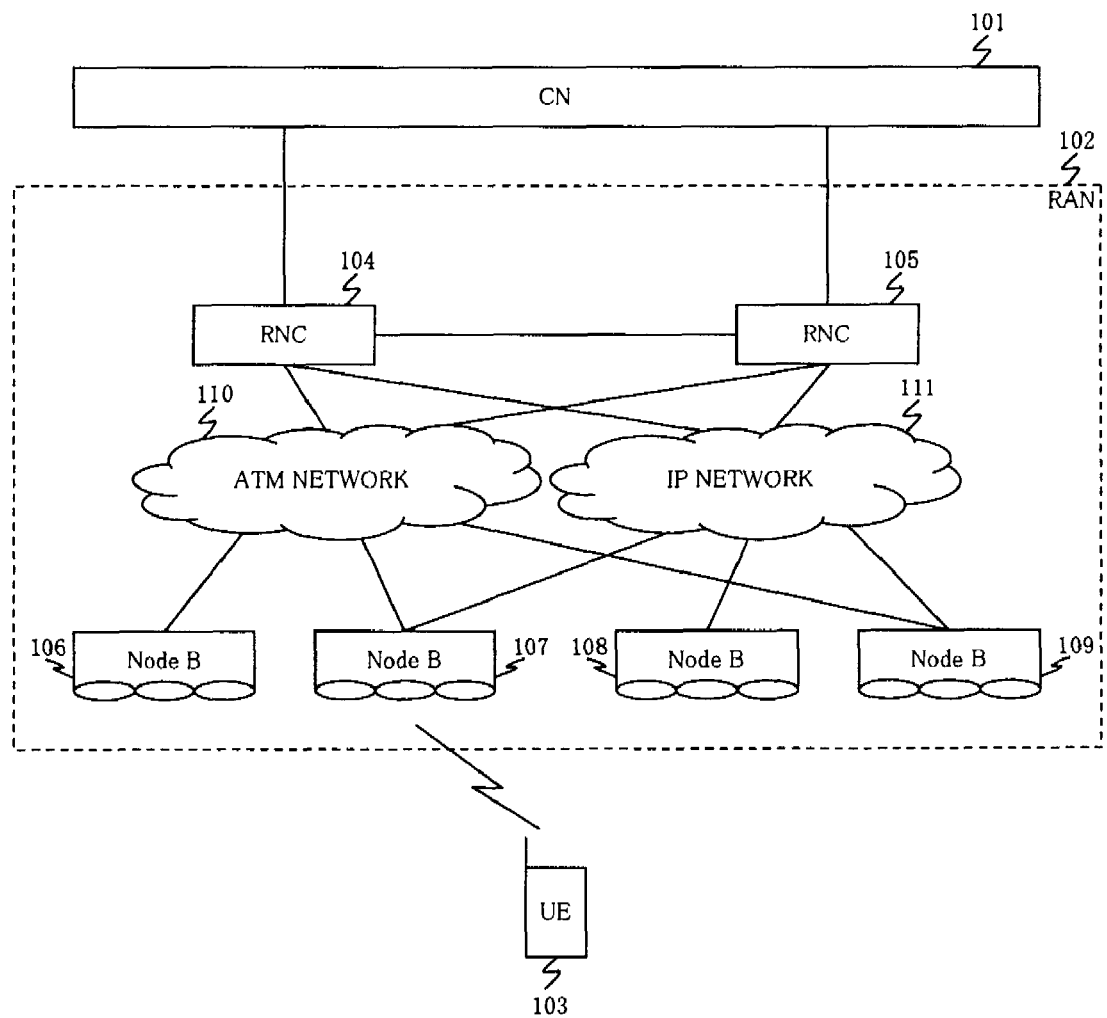
FIG. 2 is a diagram showing an embodiment of a mobile communication system of the present invention.

FIG. 2 shows a mobile communication system including CN 101, RAN 102 and UE 103. CN 101 is a conventional core network for providing a circuit-switching service or a packet-switching service. RAN 102 is a wireless access network connected with CN 101. UE 103 is a mobile device owned by a user, wirelessly connected with RAN 102.

RAN 102 further includes RNCs 104 and 105, Node Bs 106 to 109, ATM network 110 and IP network 111. Each of RNCs 104 and 105 is a wireless base station control device for controlling Node Bs 106 to 109, connected with Node Bs 106 to 109 via the networks of ATM network 110 or IP network 111. Each of Node Bs 106 to 109 is a wireless base station for covering one or more cells. The number of RNCs 104 and 105 and the number of Node Bs 106 to 109 are not limited to those shown in FIG. 2.

Figure 3:
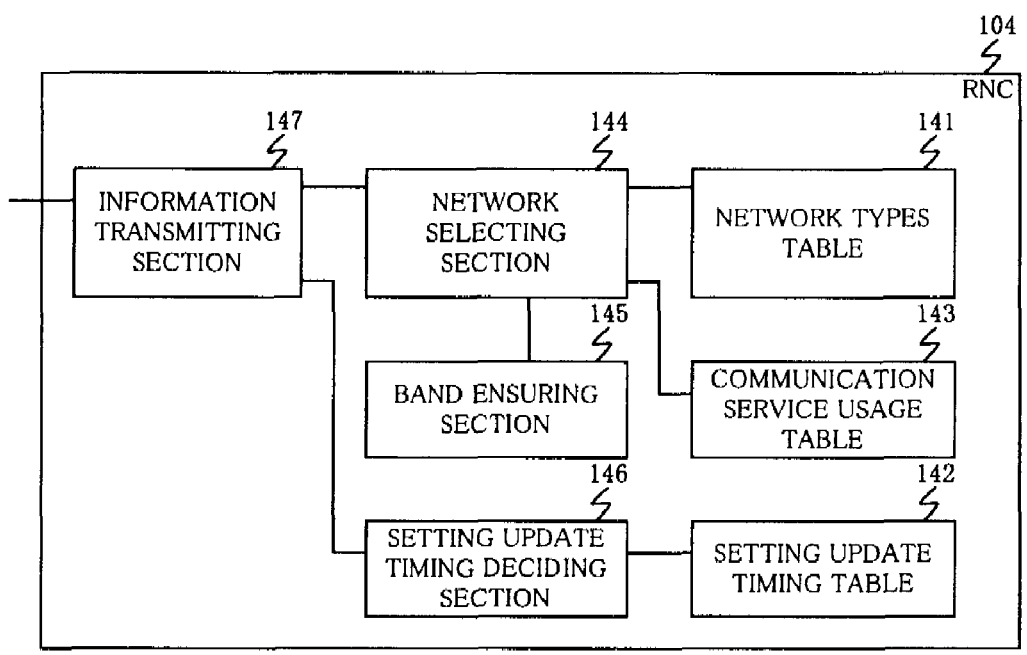
FIG. 3 is a diagram showing a configuration of the RNC shown in FIG. 2.

FIG. 3 shows RNC 104 shown in FIG. 2 including network types table 141, setting update timing table 142, communication service usage table 143, network selecting section 144, band ensuring section 145, setting update timing deciding section 146 and information transmitting section 147. FIG. 3 only shows a configuration relating to the present invention among the configuration of RNC 104 shown in FIG. 2. The configuration of RNC 105 shown in FIG. 2 is the same as that of RNC 104.

Network types table 141 is a first table to which a type of a network between Node Bs 106 to 109 has been previously registered.

FIG. 4 shows network types table 141 shown in FIG. 3, to which Node B ID, which is unique wireless base station identifying information added to each of the Node Bs 106 to 109 for identifying each of Node Bs 106 to 109, a network type, a type of information transmitted using the network are registered in association with each other. Here, Node B ID only needs to be information for enabling RNC 104 to identify each of Node Bs 106 to 109.

For example, it is registered in the table that the information transmitted to the Node B having ID=1 is transmitted over the entire ATM network. Among the information transmitted to the Node B having ID=2, a control message and circuit switched data are transmitted over the ATM network. It is registered in the table that packet switched data is transmitted over the entire IP network. It is registered in the table that information transmitted to Node B having ID=3 is transmitted over the entire IP network. Among the information transmitted to Node B having ID=4, a control message is transmitted over the ATM network. It is registered in the table that the circuit switched data and the packet switched data are transmitted over the IP network.

Setting update timing table 142 is a second table to which information of setting update timing according to a network type has been previously registered.

FIG. 5 shows the setting update timing table 142 shown in FIG. 3, to which a network type and update timing information, which is a timing for a wireless control parameter setting that is transmitted by using the network type updated at Node Bs 106 to 109, are registered in association with each other.

For example, the timing for a wireless control parameter setting that is transmitted by using network type A at Node Bs 106 to 109 and UE 103 is 100 ms is registered. Also, the timing for a wireless control parameter setting that is transmitted by using network type B at Node Bs 106 to 109 and UE 103 is 200 ms is registered. Further, the timing for a wireless control parameter setting that is transmitted by using network type C at Node Bs 106 to 109 and UE 103 is 500 ms is registered. And, the timing for a wireless control parameter setting that is transmitted by using network type D at Node Bs 106 to 109 and UE 103 is 800 ms is registered. As transmission delays differ depending on respective network types, the parameter settings are provided for transmitting update timing according to respective network types to Node Bs 106 to 109 and UE 103.

Communication service usage table 143 is a third table to which the status of communication service usage in the UE is stored.

FIG. 6 shows communication service usage table 143 shown in FIG. 3 in which UE ID, which is a mobile device that has identifying information to uniquely identifying the UE in a mobile communication system, and the status of communication service usage of the UE are stored.

For example, data is stored to show that UE having ID=1 is sending or receiving data. Also, data is stored to show that UE having ID=2 is not communicating data for several seconds. Also, data is stored to show that UE having ID=3 is not communicating data for several minutes. Data is stored to show that UE having ID=4 is sending or receiving data. Storing timings can be arbitrary set.

Network selecting section 144 selects a network by obtaining a network type according to Node B, which is the destination of the transmission, and according to the type of information to be transmitted from network types table 141.

Band ensuring section 145 ensures a band for sending and receiving information on a network.

Setting update timing deciding section 146 decides a setting update timing according to the network selected by network selecting section 144 by referring to setting update timing table 142.

Information transmitting section 147 transmits this information to Node Bs 106 to 109 or UE 103.

An operation control method in the mobile communication system with the abovementioned configuration will be described below.

Figure 7:
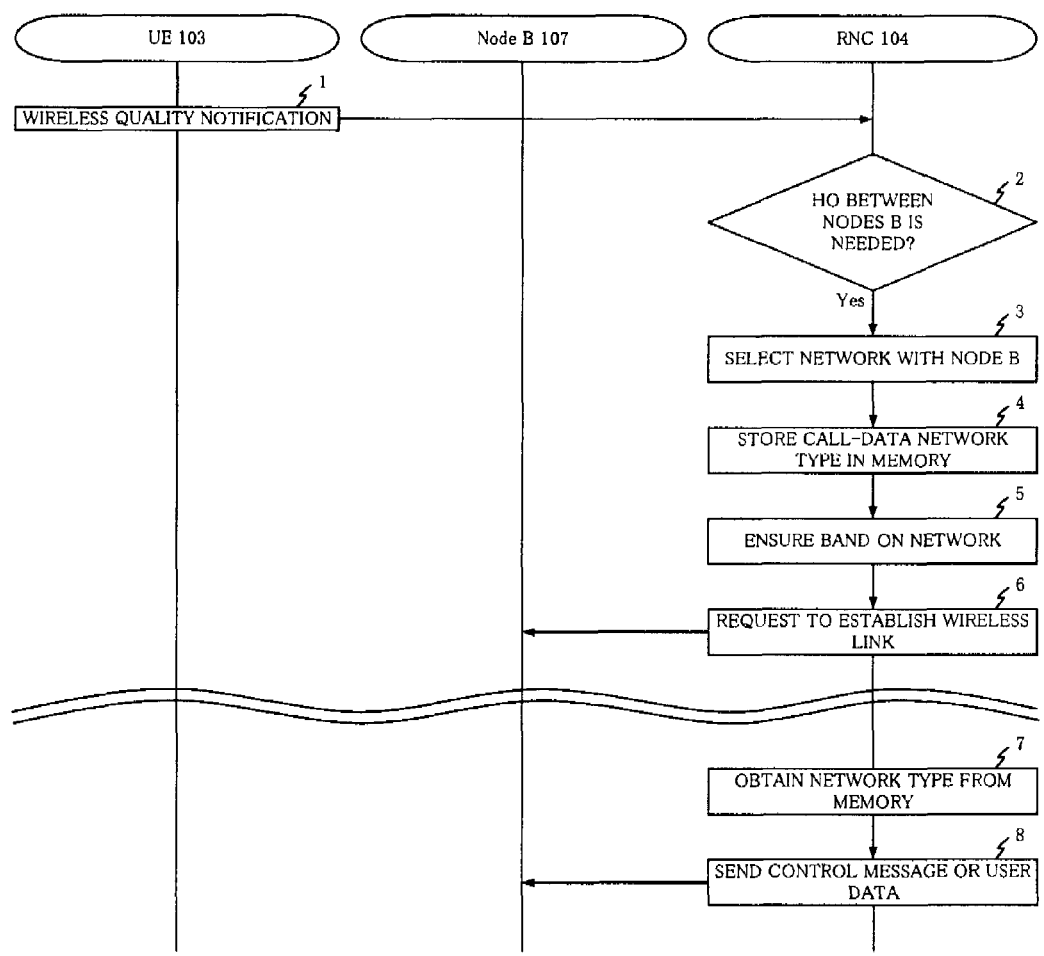
FIG. 7 is a sequence diagram for illustrating a method for selecting a network at a handover timing between base stations and ensuring a band on a network according to the type of transmitted information among the operation control methods in the mobile communication systems shown in FIG. 2 and FIG. 3.

First, a method for selecting a network at the timing of a handover between base stations and ensuring a band on the network according to the transmitted information type among the operation control methods in the mobile communication systems shown in FIG. 2 and FIG. 3 will be described with reference to FIG. 7.

When a wireless quality notification sent from UE 103 is received at RNC 104 at step 1, it is determined at step 2 whether a handover between Node Bs is needed or not based on the received wireless quality.

If it is determined that a handover between Node Bs is needed, network selecting section 144 refers to network types table 141 and selects the network type by which information is sent and received between there and Node B concerning the destination of the handover (here, Node B 107) at step 3. Describing this by using an example from the network types table 141 shown in FIG. 4, if Node B ID of Node B 107 of the destination of the handover is 2, for example, the ATM network 110 is selected as the network on which the control message and the circuit switched data are transmitted. IP network 111 is selected as the network on which the packet switched data is transmitted.

When the network type is selected, the call, the type of information to be sent and received and the network type are stored in memory (not shown) at step 4, a band required for the information to be sent and received is ensured on the network by band ensuring section 145 at step 5. The method for ensuring that the band is the same as a conventional one, will not be described here.

To establish a wireless link between there and Node B 107, a control message is sent to Node B 107 via the network at step 6.

When information is transmitted to Node B 107 after establishment of the wireless link, the network type is obtained from the memory at step 7, and information is sent via the obtained network at step 8. Describing this by using an example from the network types table shown in FIG. 4, if ID of Node B 107 is 2, the control message or the circuit switched data is sent to Node B 107 via ATM network 110. The packet switched data is sent to Node B 107 via IP network 111.

Accordingly, since the network that is suitable for the information is selected at the timing of the handover between base stations, the networks provided in the mobile communication system can be effectively used without causing any wasteful transmission delay.

Figure 8:
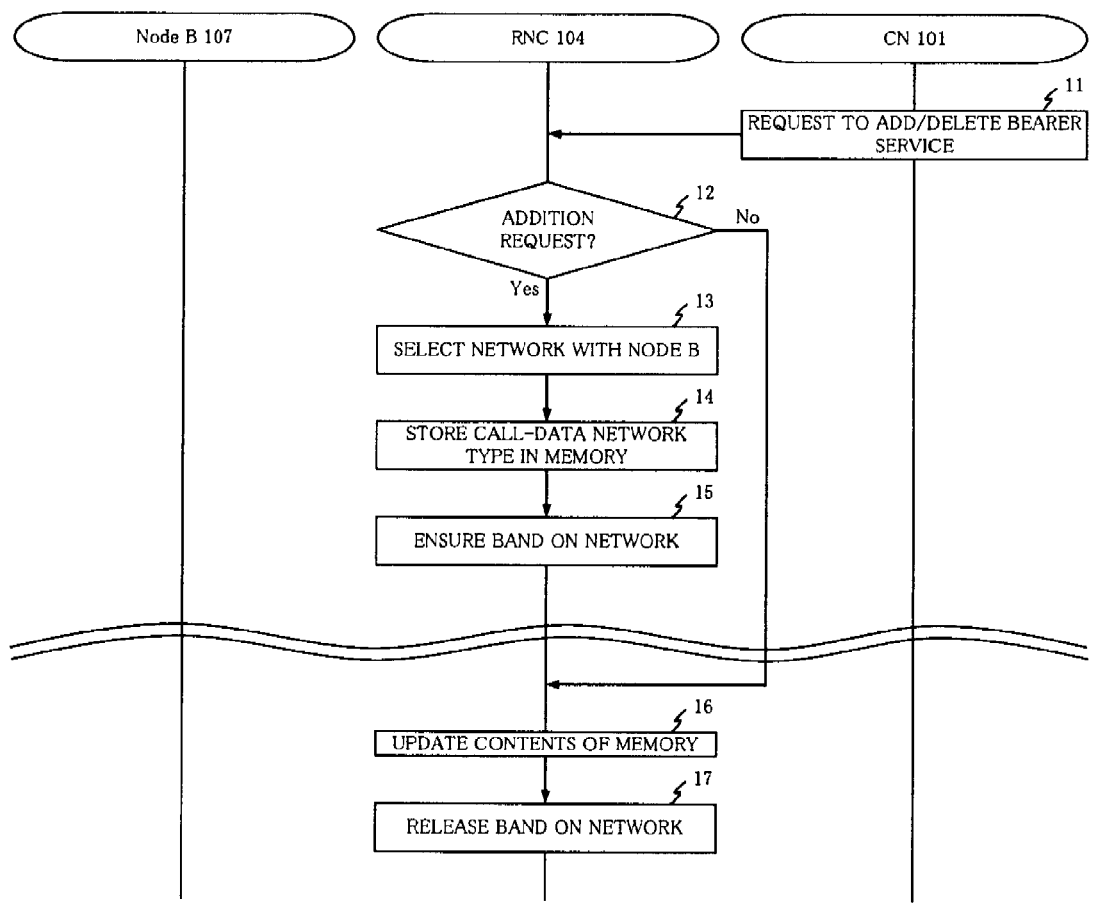
FIG. 8 is a sequence diagram for illustrating a method for selecting a network at a timing when a bearer service is added or deleted and ensuring a band on a network according to the type of transmitted information among the operation control methods in the mobile communication systems shown in FIG. 2 and FIG. 3.

Now, a method for selecting a network at a timing when a bearer service is added or deleted and for ensuring a band on the network according to the type of transmitted information, among the operation control methods in the mobile communication systems shown in FIG. 2 and FIG. 3, will be described with reference to FIG. 8.

When a request to add/delete a bearer service sent from CN 101 is received by RNC 104 at step 11, it is at step 12 determined whether the received addition/deletion request is an addition request or a deletion request.

If it is determined that the request is an addition request, a network for sending/receiving information relating to the service to be added to Node B 107 is selected by network selecting section 144. Here, network types table 141 is referred to as what is described by using the sequence diagram shown in FIG. 7 and a network is selected based on the contents registered in network types table 141.

When a network is selected, the call, the type of the information to be sent and received and network type are stored in memory (not shown) at step 14, and a band ensuring section 145 ensures a band required for the information to be sent and received on the network at step 15.

If it is determined that it is not an addition request, i.e., it is a deletion request at step 12, the contents of the memory are updated at step 16 to delete the corresponding bearer service, and the ensured band is released at step 17.

Accordingly, since the network that is suitable for the information is selected at the timing when the bearer service is added or deleted, the networks provided in the mobile communication system can be effectively used without causing any unwanted transmission delay.

Figure 9:
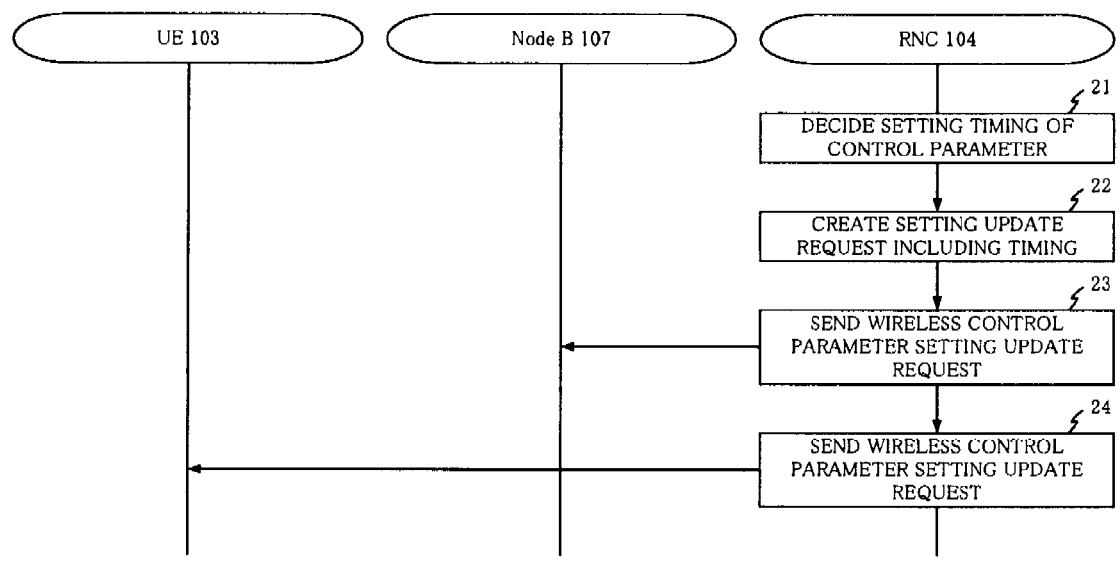
FIG. 9 is a sequence diagram for illustrating a method for sending a request to update the wireless control parameter among the operation control methods in the mobile communication systems shown in FIG. 2 and FIG. 3.

Now, a method for creating and sending an update request of a wireless control parameter setting, from among operation control methods in the mobile communication systems shown in FIG. 2 and FIG. 3, will be described with reference to FIG. 9.

If the wireless control parameter setting in Node B 107 or UE 103 is updated by RNC 104, setting update timing deciding section 146 refers to setting update timing table 142 and a timing for the setting to be updated in Node B 107 or UE 103 is decided. This means that an update timing is decided based on the network type by which the wireless control parameter is transmitted. Describing this with an example of setting update timing table 142 shown in FIG. 5, for example, if the network type is A, the update timing is decided as 100 ms.

A setting request message of a wireless control parameter including update timing information, which is update timing, is created at step 22, and the created setting request message is sent to Node B 107 via a network at step 23. The setting request message is sent to UE 103 via a network at step 24. Here, the setting request message may be any message provided that is only includes update timing. The other details of the setting request message are not defined.

This can prevent a shift in update timing due to a transmission delay that differs for each network type.

Figure 10:
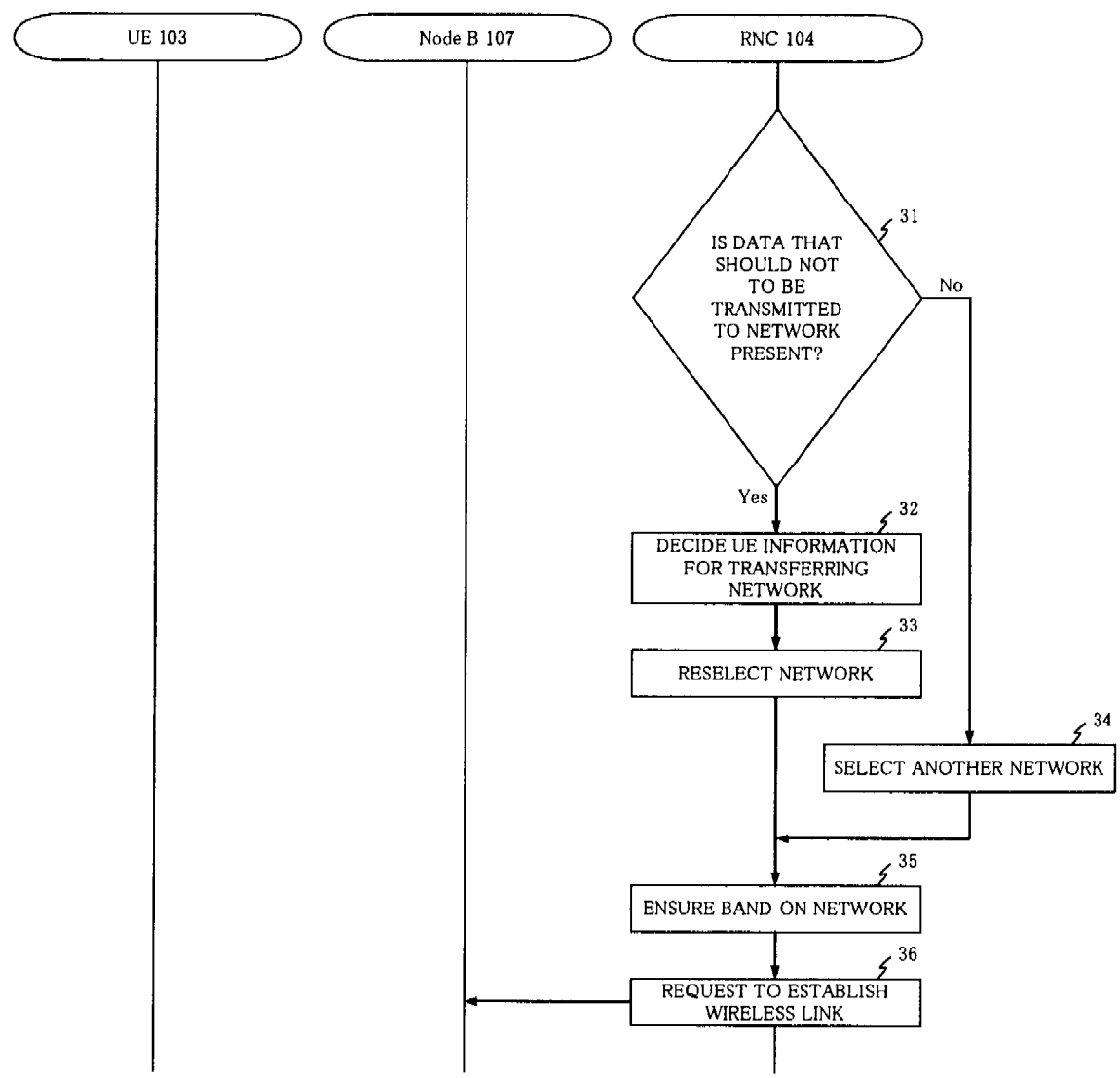
FIG. 10 is a sequence diagram for illustrating a method for reselecting a network in the case where no band can be ensured on a network among the operation control methods in the mobile communication systems shown in FIG. 2 and FIG. 3.

Now, a method for reselecting a network in the case where no band can be ensured on a network, from among the operation control methods in the mobile communication systems shown in FIG. 2 and FIG. 3, will be described with reference to FIG. 10.

If it is determined that a band having the sufficient availability for transmitting information cannot be ensured on the selected network by band ensuring section 145, it will be decided at step 31 whether or not there is any data which is not essential for transmission on a network. This is done by checking the association among the calls, the type of data to be sent and received and the type of the network that are stored in memory.

If data that does not have an essential need to be sent or received, is sent or received on the network, communication service usage table 143 is referred to at step 32 and a determination is made to transfer UE information to another network. If the network is sending or receiving data, it is difficult to transmit the information to another network. If communication has not been performed for a long time or the like in the network, the information can be transmitted to another network.

Then at step 33, network selecting section 143 reselects a network based on network types table 141. That selecting method is the same as that described at step 3.

On the other hand, if only the data for which there is an essential need to send or to receive, is sent or received on the network, another network is selected based on network types table 141 at step 34. That selecting method is also the same as that described at step 3.

Thereafter, band ensuring section 145 ensures the band on the network selected according to the type of the information to be transmitted at step 35, and a request to establish a wireless link is issued at step 36.

If it is determined that a band having the sufficient availability for transmitting information cannot be ensured on the selected network by band ensuring section 145, it may be that another network will be selected and that a band having the sufficient availability for transmitting the information will be ensured on that other network.

While a preferred embodiment of the present invention has been described in specific terms, such description is for illustrative purpose only, and it is to be understood that changes and variations may be made without departing from the spirit or scope of the following claims.

What is claimed is:

1. A mobile communication system comprising:
   a mobile device;
   a wireless base station for covering one or more cells; and
   a wireless base station control device for controlling said wireless base station, comprising:
   a first table, in which wireless base station identifying information for identifying said wireless base station, a network type of a network between the wireless base station and the wireless base station control device, and a type of information to be transmitted on said network, are registered in association with each other,
   a network selecting section that selects a network associated with said wireless base station identifying information and a type of information transmitted on said network by referring to said first table at a timing of handover between said wireless base stations and ensuring a band for said network for transmitting said information to be transmitted;
   a second table, in which said network type and update timing information for said wireless base station and said mobile device for updating settings based on setting information that is requested to be updated by said wireless base station control device are registered in association with each other,
   a setting update timing deciding section that creates a setting request message including update timing information associated with each of said network types by referring to said second table; and
   an information transmitting section that sends said setting request message to said wireless base station and said mobile device via said network.

2. The mobile communication system according to claim 1, wherein said wireless base station control device selects a network associated with said wireless base station identifying information and a type of information transmitted on said network by referring to said first table at a timing when a bearer service is added or deleted and ensures a band for said network for transmitting said information to be transmitted.

3. A wireless base station control device, wherein said wireless base station control device is connected with a wireless base station that covers a cell in which a mobile station can be present via a network for each of a plurality of networks types, comprises a first table, in which wireless base station identifying information for identifying said wireless base station, a network type of said network between the wireless base station and the wireless base station control device, and a type of information to be transmitted on said network are registered in association with one another, a network selecting section that selects a network associated with said wireless base station identifying information and the type of information transmitted on said network by referring to said first table at a timing of handover between said wireless base stations and ensures a band for said network for transmitting said information to be transmitted;

a second table, in which said network type and update timing information for said wireless base station and said mobile device to update settings based on setting information that is requested to be updated by said wireless base station control device are registered in association with each other, a setting update timing deciding section that creates a setting request message including update timing information associated with each of said network types by referring to said second table; and an information transmitting section that sends said setting request message to said wireless base station and said mobile device via said network.

4. The wireless base station control device according to claim 3, wherein said wireless base station control device selects a network associated with said wireless base station identifying information and a type of information transmitted on said network by referring to said first table at a timing when a bearer service is added or deleted and ensures a band for said network for transmitting said information to be transmitted.

5. A method in a mobile communication system comprising a mobile device, a wireless base station for covering one or more cells, a wireless base station control device for controlling said wireless base station and comprising a first table, in which wireless base station identifying information for identifying said wireless base station, a network type of a network with said wireless base station, and a type of information to be transmitted on said network are registered in association with each other, a second table, in which update timing information for said wireless base station and said mobile device to update settings and said network type are registered in association with each other, and comprising networks of a plurality of network types between said wireless base station, said method comprising:

a step for said wireless base station control device to select a network associated with said wireless base station identifying information and a type of information transmitted on said network by referring to said first table at a timing of handover between said wireless base stations;

a step for said wireless base station control device to ensure a band for said network for transmitting said information to be transmitted;

a step for said wireless base station control device to create a setting request message including update timing information associated with said network types by referring to said second table; and a step for said wireless base station control device to send said setting request message to said wireless base station and said mobile device via said network.

6. The method according to claim 5, comprising:

a step for said wireless base station control device to select a network associated with said wireless base station identifying information and a type of information transmitted on said network by referring to said first table at a timing when a bearer service is added or deleted; and a step for said wireless base station control device to ensure a band for said network for transmitting said information to be transmitted.

7. A mobile communication system comprising:

a mobile device;

a wireless base station for covering one or more cells; and a wireless base station control device for controlling said wireless base station, comprising a first table, in which wireless base station identifying information for identifying said wireless base station, a network type of a network between the wireless base station and the wireless base station control device, and a type of information to be transmitted on said network, are registered in association with each other, a network selecting section that selects a network associated with said wireless base station identifying information and a type of information transmitted on said network by referring to said first table at a timing of handover between said wireless base stations and ensuring a band for said network for transmitting said information to be transmitted; and wherein, if said wireless base station control device cannot ensure a band for said network for transmitting said information to be transmitted, said wireless base station control device selects a network other than the network associated with said wireless base station identifying information and a type of information to be transmitted on said network by referring to said first table and ensures a band for transmitting said information on the selected network.

8. The mobile communication system according to claim 7, wherein said wireless base station control device selects a network associated with said wireless base station identifying information and a type of information to be transmitted on said network in said first table for the information transmitted on the network other than the network associated with said wireless base station identifying information and a type of information to be transmitted on said network in said first table, and ensures a band for transmitting said information on the selected network.

9. The mobile communication system according to claim 8, wherein said wireless base station control device has a third table, in which the status of network usage is stored, selects a network associated with said wireless base station identifying information and a type of information to be transmitted on said network in said first table for information transmitted on the network other than the network associated with said wireless base station identifying information and a type of information to be transmitted on said network in said first table based on said third table, and ensures a band for transmitting said information on the selected network.

10. The mobile communication system according to claim 7, wherein said wireless base station control device selects a network associated with said wireless base station identifying information and a type of information transmitted on said network by referring to said first table at a timing when a bearer service is added or deleted and ensures a band for said network for transmitting said information to be transmitted.

11. A wireless base station control device, wherein said wireless base station control device is connected with a wireless base station that covers a cell in which a mobile station can be present via a network for each of a plurality of networks types, comprises
    a first table, in which wireless base station identifying information for identifying said wireless base station, a network type of said network between the wireless base station and the wireless base station control device, and a type of information to be transmitted on said network are registered in association with one another,
    a setting update timing deciding section that selects a network associated with said wireless base station identifying information and the type of information transmitted on said network by referring to said first table at a timing of handover between said wireless base stations and ensures a band for said network for transmitting said information to be transmitted;
    wherein, if said wireless base station control device cannot ensure a band for said network for transmitting said information to be transmitted, said wireless base station control device selects a network other than the network associated with said wireless base station identifying information and a type of information to be transmitted on said network by referring to said first table and ensures a band for transmitting said information on the selected network.

12. The wireless base station control device according to claim 11, wherein said wireless base station control device selects the network associated with said wireless base station identifying information and a type of information to be transmitted on said network in said first table for the information transmitted on the network other than the network associated with said wireless base station identifying information and the type of information to be transmitted on said network in said first table, and ensures a band for transmitting said information on the selected network.

13. The wireless base station control device according to claim 12, wherein said wireless base station control device comprises a third table, in which the status of network usage is stored, selects a network associated with said wireless base station identifying information and a type of information to be transmitted on said network in said first table for information transmitted on the network other than the network associated with said wireless base station identifying information and a type of information to be transmitted on said network in said first table based on said third table, and ensures a band for transmitting said information on the selected network.

14. The wireless base station control device according to claim 11, wherein said wireless base station control device selects a network associated with said wireless base station identifying information and a type of information transmitted on said network by referring to said first table at a timing when a bearer service is added or deleted and ensures a band for said network for transmitting said information to be transmitted.

15. A method in a mobile communication system comprising a mobile device, a wireless base station for covering one or more cells, a wireless base station control device for controlling said wireless base station and comprising a first table, in which wireless base station identifying information for identifying said wireless base station, a network type of a network with said wireless base station, and a type of information to be transmitted on said network are registered in association with each other, and a second table, in which update timing information for said wireless base station and said mobile device to update settings and said network type are registered in association with each other, and networks of a plurality of network types between said wireless base station and said wireless base station control device, the method comprising:
    a step for said wireless base station control device to select a network associated with said wireless base station identifying information and a type of information transmitted on said network by referring to said first table at a timing of handover between said wireless base stations;
    a step for said wireless base station control device to ensure a band for said network for transmitting said information to be transmitted;
    if said wireless base station control device cannot ensure a band for said network for transmitting said information to be transmitted, a step for said wireless base station control device to select a network other than the network associated with said wireless base station identifying information and a type of information to be transmitted on said network by referring to said first table; and
    a step for said wireless base station control device to ensure a band for transmitting said information on the selected network.

16. The method according to claim 15, comprising:
    a step for said wireless base station control device to select the network associated with said wireless base station identifying information and a type of information to be transmitted on said network in said first table for the information being transmitted on the network other than the network associated with said wireless base station identifying information and a type of information to be transmitted on said network in said first table, and
    a step for said wireless base station control device to ensure a band for transmitting said information on said selected network.

17. The method according to claim 16, comprising:
    a step for said wireless base station control device to select a network associated with said wireless base station identifying information and a type of information to be transmitted on said network in said first table for information transmitted on the network other than the network associated with said wireless base station identifying information and a type of information to be transmitted on said network in said first table based on said third table, in which the status of network usage is stored, and
    a step for said wireless base station control device to ensure a band for transmitting said information on the selected network.

18. The method according to claim 15, comprising:
    a step for said wireless base station control device to select a network associated with said wireless base station identifying information and a type of information transmitted on said network by referring to said first table at a timing when a bearer service is added or deleted; and
    a step for said wireless base station control device to ensure a band for said network for transmitting said information to be transmitted.

* * * * *